(12) United States Patent
Meyer

(10) Patent No.: US 10,878,615 B2
(45) Date of Patent: Dec. 29, 2020

(54) TECHNIQUE FOR PROCESSING X-RAY DIFFRACTION DATA

(71) Applicant: RIGAKU CORPORATION, Tokyo (JP)

(72) Inventor: Mathias Meyer, Wroclaw (PL)

(73) Assignee: RIGAKU CORPORATION, Tokyo (JP)

( * ) Notice: Subject to any disclaimer, the term of this patent is extended or adjusted under 35 U.S.C. 154(b) by 25 days.

(21) Appl. No.: 16/392,906

(22) Filed: Apr. 24, 2019

(65) Prior Publication Data
US 2019/0325635 A1 Oct. 24, 2019

(30) Foreign Application Priority Data
Apr. 24, 2018 (EP) .................................... 18168895

(51) Int. Cl.
*G06T 15/08* (2011.01)
*G06T 7/194* (2017.01)
(Continued)

(52) U.S. Cl.
CPC ........... *G06T 15/08* (2013.01); *G01N 23/207* (2013.01); *G01N 23/20025* (2013.01);
(Continued)

(58) Field of Classification Search
None
See application file for complete search history.

(56) References Cited

U.S. PATENT DOCUMENTS

| 9,864,075 | B2 | 1/2018 | Giencke | |
|---|---|---|---|---|
| 2014/0119512 | A1* | 5/2014 | Matsushita | ............... G01T 1/16 378/81 |
| 2018/0356354 | A1* | 12/2018 | Doi | ......... G01N 23/04 |

FOREIGN PATENT DOCUMENTS

| EP | 2 775 295 A1 | 9/2014 |
|---|---|---|
| WO | WO 2007/052688 A1 | 5/2007 |

(Continued)

OTHER PUBLICATIONS

European Search Report of EP 18 16 8895, dated Nov. 13, 2018.
(Continued)

*Primary Examiner* — Dov Popovici
(74) *Attorney, Agent, or Firm* — Birch, Stewart, Kolasch & Birch, LLP

(57) ABSTRACT

A method of processing X-ray diffraction data, the data is provided by an X-ray detector configured to detect diffracted X-ray beams of a sample. The method including acquiring X-ray diffraction data from the X-ray detector while the sample is rotating with respect to an incident X-ray beam, generating a 2D image frame from the acquired X-ray diffraction data, wherein the generated 2D image frame includes 2D image data representing X-ray diffraction data for a specific rotational position of the sample, for the generated 2D image frame, distinguishing the sample relevant X-ray diffraction data from the background data; mapping the distinguished sample relevant X-ray diffraction data of the generated 2D image frame into a single 3D reciprocal space; and visualizing the 3D reciprocal space along with the mapped X-ray diffraction data on a display screen. Further provided is an apparatus and an X-ray device implementing the method.

18 Claims, 7 Drawing Sheets

(51) Int. Cl.
*G01N 23/20025* (2018.01)
*G01N 23/207* (2018.01)
*G06T 11/00* (2006.01)

(52) U.S. Cl.
CPC ............ G06T 7/194 (2017.01); G06T 11/003 (2013.01); *G01N 2223/3306* (2013.01); *G01N 2223/401* (2013.01); *G06T 2200/24* (2013.01); *G06T 2207/10116* (2013.01)

(56) References Cited

FOREIGN PATENT DOCUMENTS

| WO | WO 2008/035959 A1 | 3/2008 |
| WO | WO 2015/183907 A1 | 12/2015 |

OTHER PUBLICATIONS

International Tables for Crystallography (2006), vol. F, Chapter 11.2 "Integration of macromolecular diffraction data", pp. 212-217.
International Tables for Crystallography (2006), vol. F, Chapter 11.3 "Integration, scaling, space-group assignment and post refinement", pp. 218-225.

\* cited by examiner

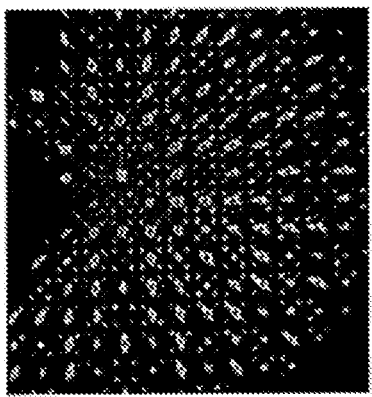
Fig. 5b Weak superlattice diffraction
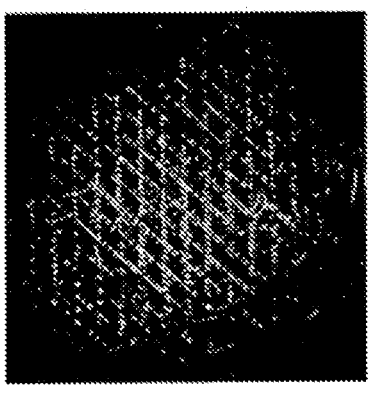
Fig. 5d Twinned crystal diffraction (overlapping rotated lattices)
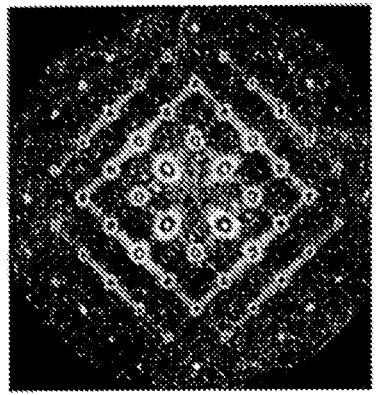
Fig. 5a Diffuse diffraction
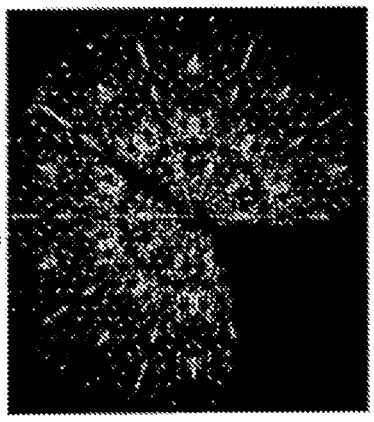
Fig. 5c Quasi crystal diffraction (10-fold symmetry)

TECHNIQUE FOR PROCESSING X-RAY DIFFRACTION DATA

CROSS-REFERENCE TO RELATED APPLICATIONS

This application claims the benefit of priority under 35 U.S.C. § 119 to European Patent Application No. 18 16 8895, filed Apr. 24, 2018, the contents of which are incorporated herein by reference in their entirety.

FIELD OF THE INVENTION

The present invention generally relates to the field of X-ray analysis. More particularly, the invention relates to a method and apparatus for processing X-ray diffraction data.

BACKGROUND

X-ray analysis techniques, such as X-ray diffraction, have become very popular because they employ a non-destructive analysis of samples. For instance, X-ray diffraction has become one of the fundamental experimental techniques for investigating properties of crystalline, polycrystalline or powder samples.

The general principle of X-ray diffraction on a sample to be investigated is as follows. An X-ray source generates an X-ray beam (for instance, a monochromatic or polychromatic X-ray beam). The generated X-ray beam is collimated and directed by a corresponding X-ray optics to the sample to be investigated. The incident beam on the sample is diffracted by the crystal lattice of the sample. Diffracted beams occur at incident angles where the Bragg condition is met (that is, at angles where coherent scattering from the crystal lattice of the sample is expected). The diffracted beams are detected by a two-dimensional X-ray detector (in short 2D X-ray detector) which may be planar, segmented or curved and visualized using appropriate imaging techniques. The diffracted beams form a pattern which is characteristic for the crystal structure of the sample to be investigated. The pattern can be used for deducing structural properties of the sample, such as crystal lattice structure, lattice symmetry, lattice distortions, presence of interlayers, superlattice structures, twinned crystals and so on.

In order to obtain the whole pattern information, the sample is rotated during X-ray diffraction and the intensity of the diffracted beams is continuously measured by the 2D X-ray detector. The obtained intensity information is visualized using an appropriate image processing algorithm. In practice, the visualization of the pattern is performed by generating a sequence of consecutive two-dimensional (2D) images while the sample is rotating. By comparing the 2D images of the image sequence the properties of the crystal lattice structure can be deduced. However, the presentation of the diffraction pattern in a sequence of 2D still images has some disadvantages. The diffracted beams positions on the images are distorted by the geometry of the instrument (in particular the form of the detector surface) and the beams are usually present on several consecutive images as the crystal rotates through the Bragg diffraction condition for the beam. This makes it difficult to clearly observe the data as a whole and intuitively assess its crystallographic quality. Artifacts, weak diffuse features or twinned crystals can be missed from the data analysis. Moreover, structural properties of the sample to be investigated can only be derived after a sufficient number of 2D images are available and comparable with each other.

Accordingly, there is a need of an improved X-ray detection technique which overcomes the above mentioned problems known from standard detection techniques. In particular, there is a need for an X-ray detection technique which allows for a more accurate and faster determination of crystal structure properties of crystalline samples.

SUMMARY AND INTRODUCTORY DESCRIPTION

To solve the above-mentioned problems a computer implemented method for processing X-ray diffraction data is provided, wherein the X-ray diffraction data are provided by an X-ray detector configured to detect diffracted X-ray beams of a sample to be investigated. The method includes the steps of: (a) acquiring X-ray diffraction data from the X-ray detector while the sample is rotating with respect to an incident X-ray beam; (b) generating a two-dimensional (2D) image frame from the acquired X-ray diffraction data; wherein the generated 2D image frame includes 2D image data representing X-ray diffraction data for a specific rotational position of the sample; the X-ray diffraction data including sample relevant X-ray data and background data; (c) for the generated 2D image frame; distinguishing the sample relevant X-ray diffraction data from the background data; (d) mapping the distinguished sample relevant X-ray diffraction data of the generated 2D image frame into a three-dimensional (3D) reciprocal space; and (e) visualizing the 3D reciprocal space along with the mapped X-ray diffraction data on a display screen.

The 3D reciprocal space is the momentum space (or K-space). The reciprocal lattice of the sample can be deduced from the mapped and visualized X-ray diffraction data (diffracted X-ray beams) in the 3D reciprocal space.

In the following the terms "sample relevant X-ray diffraction data" and "crystallographically meaningful X-ray data" are synonymously and interchangeably used. With "sample relevant X-ray diffraction data" or "crystallographically meaningful X-ray data" diffracted X-ray beams, X-ray satellite beams, (localized) diffuse scattered X-rays and/or powder diffraction lines are meant, but not unwanted background (caused, for instance, by detector noise or Compton scattering). Optionally, and depending on the experimental needs sample relevant X-ray diffraction data" and "crystallographically meaningful X-ray data" may also include artifacts, e.g. ice on the sample, X-ray scattering from instrument parts such as pinholes, beamstop or high pressure cell gasket.

The method steps (a) to (e) are continuously repeated while the rotational position of the sample is changing. More specifically, X-ray diffraction data may continuously be acquired during rotation of the sample. Further, a sequence of 2D image frames may be generated based on the continuously acquired X-ray diffraction data. The generation of the 2D image frames may be performed such that each 2D image frame represents (sample relevant) X-ray diffraction data obtained for a specific rotational position of the sample. According to one implementation X-ray diffraction data may be acquired in angular distances of 0.1 degree or higher. Accordingly, the consecutively generated 2D image frames may have an angular resolutions of 0.1 degree or higher. The angular width of the 2D image frames may be a user chosen parameter which can be set according to the experimental angular resolution required for the sample being studied.

The step of distinguishing may include segmenting the X-ray diffraction data of the 2D image frame into the sample relevant X-ray diffraction data and the unwanted background data by an appropriate image processing algorithm. The sample relevant X-ray diffraction data typically occupies a few percent of the 2D image frame and consists of diffracted X-ray beams, satellite beams, localized diffuse scattered X-rays and/or powder diffraction lines. The used image processing algorithm may be designed to segment (distinguish) the varying image features from the smooth background features of the 2D image frame. For this purpose, the image processing algorithm may apply feature detection according to the nature of the sample relevant X-ray diffraction data for the segmentation from the unwanted background. Further, the image processing algorithm may perform a background calculation or background estimation (e.g., a background fit) based on the found background data areas. Still further, the image processing algorithm may subtract the calculated or estimated background from the X-ray diffraction data. To perform at least one of the above mentioned feature detection and background calculation (estimation) an image processing algorithm as described in the "International Tables for Crystallography (2006)" Vol. F, Chapter 11.2 "Integration of macromolecular diffraction data", pp. 212-217 or in the "International Tables for Crystallography (2006)" Vol. F, Chapter 11.3 "Integration, scaling, space-group assignment and post refinement", pp. 218-225 may be used, the teachings of which are incorporated herein by reference. The resulting sample relevant X-ray diffraction data areas are a small fraction of the original 2D image frame and this data amount reduction by a factor of typically 20 or higher allows an effective operation of the subsequent steps.

As soon as a 2D image frame is generated (and the sample relevant X-ray diffraction data are distinguished from the background data), the mapping of the (sample relevant) X-ray diffraction data of the corresponding 2D image frame into the 3D reciprocal space and the visualization of the mapped X-ray diffraction data in the 3D reciprocal space may be performed. This means that the mapping of the distinguished (segmented) 2D image data representing the acquired (sample relevant) X-ray diffraction data (e.g., diffracted X-ray beams) into the 3D reciprocal space and their visualization in the 3D reciprocal space is performed in a (near) real-time mode, that is, while the X-ray diffraction data acquisition is in progress. Thus, according to the present invention each newly generated 2D image frame is processed just immediately after its generation in order to map the (sample relevant) X-ray diffraction data of the 2D image frame to the 3D reciprocal space. Hence, the present data processing technique differs from known data processing techniques where the full sequence of 2D image frames over the whole measurement range is acquired first, and a post-processing of the full 2D image frame sequence is performed in order to perform a 3D visualization of X-ray diffraction data.

Near real-time processing of 2D image data, as opposed to post-processing, requires fast data processing which has been made possible in recent times by the improvement in personal computer specifications (such as processor speed, multi-core parallel processing and graphics processors optimised for 3D image visualisation). Moreover, appropriate image processing algorithms as mentioned above for distinguishing the sample relevant X-ray diffraction data may be used in order to increase speed and data processing efficiency.

Each 2D image frame is generated by applying an appropriate image processing algorithm capable of converting the X-ray diffraction data (raw detector data) into corresponding 2D image data. The 2D image data of the 2D image frame includes segmented 2D image data distinguishing the sample relevant X-ray diffraction data and the unwanted background data. The X-ray diffraction data may include at least intensity data measured by a corresponding 2D X-ray detector. The measured intensity data may include intensities associated with diffracted X-ray beams, satellite beams and/or diffuse scattered X-rays. The measured intensity data may also include unwanted background intensities (due to incoherent Compton scattering and noise).

The intensity data obtained from the X-ray detector may be converted into corresponding 2D image data. Each 2D image frame may include 2D image data corresponding to the intensities measured by the 2D X-ray detector for a specific rotational position of the sample. The 2D image data (of each image frame) may represent the measured intensities through appropriate image parameters that scale with the measured intensity values. As image parameters at least one of brightness, color value and color shade may be used. Hence, areas with high intensities (sample relevant intensities) which correspond to diffracted X-ray beams (satellite beams or diffuse scattered X-rays) may be represented as bright and/or colored areas (i.e., 2D spots) in the 2D image frame. Similarly, frame areas of low or suppressed intensities may represent background areas. These areas may be represented as dark areas or implicitly not taken into account at all.

Each generated 2D image frame may be rendered as pixel image frame. Accordingly, the 2D image data may include 2D pixel image data, which represents the measured intensities by allocating at least one appropriate image parameter (e.g., color value, brightness) to each pixel of the pixel image frame. Thus, in the pixel image frame each 2D spot representing diffracted X-ray beams, diffracted satellite beams or diffuse scattered X-rays may be represented by at least one pixel. The at least one pixel representing a 2D spot may have a brightness, color value, color shade or other color parameter which scales with the measured intensity of the diffracted X-ray beam.

The majority of the 2D image area (2D pixel image data) may consist of unwanted background. The (crystallographically meaningful) X-ray diffraction data may occupy up to 5% of the 2D image area. Unwanted background areas (or 2D pixel image data including unwanted background data) may be identified (by an appropriate image processing algorithm as described above) in the 2D image. Moreover, the identified image areas (or 2D pixel image data) that include background may be eliminated (by the image processing algorithm). Accordingly, pixels of the 2D image frame representing (sample relevant) X-ray diffraction data are distinguished from pixels of the 2D image frame representing background data. Further, only (sample relevant) X-ray diffraction data distinguished (segmented) from the background is mapped into the 3D reciprocal space. By mapping only the crystallographically meaningful (sample relevant) data from the 2D image the computational task is reduced and near real-time speed can be achieved.

The mapping may include mapping the crystallographically meaningful (i.e. sample relevant) X-ray diffraction data that has been distinguished from the (unwanted) background into the 3D reciprocal space. In this context, mapping the crystallographically meaningful (sample relevant) X-ray diffraction data may mean mapping into the 3D reciprocal space the 2D image data of the 2D image frames which represents diffracted X-ray beams, X-ray satellite beams, diffuse scattered X-rays but not the background data. Accordingly, by mapping the crystallographically meaningful (sample relevant) X-ray diffraction data a 3D reciprocal space map can be created which is not limited to particular diffraction features (such as Bragg peaks), but which contains the whole diffraction information (i.e., diffracted X-ray beams, X-ray satellite beams, diffuse scattered X-rays as distinguished by the appropriate image processing algorithm) obtainable by X-ray diffraction experiments. The mapping of the full diffraction information into the 3D reciprocal space allows the user for a better study of the sample properties, which goes beyond a mere study of the crystal lattice structure. In particular, the presence of twinned crystals, disorder, lattice superstructures or quasi-crystal behaviour in the sample can be better observed from the whole diffraction data than from data only showing the main Bragg peaks of the X-ray diffraction experiment. Additionally, by mapping the whole crystallographically meaningful (sample relevant) information image artifacts (e.g. ice on the sample, X-ray scattering from instrument parts such as pinholes, beamstop or high pressure cell gasket) may also be better visible to the user and show the quality or problems with the experiment.

The mapping of the (sample relevant) X-ray diffraction data represented by the 2D image frames into the 3D reciprocal space may be performed based on at least one of the following parameters: sample orientation, detector size, detector position relative to the sample, X-ray wavelength and the Ewald sphere geometry. It is known that appearance and location of diffraction beams in the generated 2D image frames depends on the detector size, the distance of the detector to the sample and the angular position (orientation) of the sample relative to the incidence X-ray beam, since diffracted X-ray beams are only obtained for reciprocal lattice points which intersect with the surface of the Ewald sphere while the sample is rotating. Accordingly, by knowing the wavelength of the X-ray beam used for the X-ray diffraction experiment (the wavelength is inversely proportional to the Ewald sphere radius), the sample orientation (derivable from the rotational position of the sample which continuously changes during data acquisition) as well as the geometry of the experiment (in particular the distance of the detector to the sample as well as the detector dimensions), the 3D reciprocal lattice can be reconstructed based on the X-ray diffraction data (e.g. diffraction peaks) represented in the sequence of 2D image frames acquired from the crystal sample.

If the crystal symmetry (or crystallographic space group) of the sample is known, the mapping may further include reconstructing the full X-ray diffraction data set for the sample in the 3D reciprocal space based on an acquired subset of X-ray diffraction data and the crystal symmetry. Further, the visualizing step may include visualizing the reconstructed X-ray diffraction data on the display screen. In such a case the crystal symmetry (or crystallographic space group) may be provided as input parameter (by a user) and the mapping algorithm may calculate the X-ray diffraction data over the whole angular range by using the acquired subset of X-ray diffraction data for a partial angular range and the symmetry of the lattice. By reconstructing the full diffraction data set from a subset of X-ray diffraction data, the X-ray diffraction data processing can be simplified and accelerated, since only a smaller X-ray diffraction data set over a partial angular range has to be acquired and processed, while the X-ray diffraction data over the remaining angular range, for which no X-ray diffraction data is acquired, is generated mathematically by exploiting the symmetry of the lattice.

The 3D reciprocal space may be represented by a voxel grid (i.e. an array of voxels). The voxel grid may have a predetermined resolution (for instance 1024×1024×1024 voxels). In dependence of the experimental needs the resolution of the voxel grid may be adjusted or pre-set (by a user) accordingly. That is, the size of each voxel (and therefore the number of voxels for representing the 3D reciprocal space) should be pre-set such that each diffracted X-ray beam representing a reciprocal lattice point of the reciprocal lattice of the sample can be represented by at least one voxel. In other words, the size of the voxels should be smaller than the size of the diffracted X-ray beams and/or distance between neighbouring diffracted X-ray beams in order to provide a fully-resolved 3D representation of the acquired X-ray diffraction data. If the size of the voxels is chosen to be smaller than the size of the diffracted X-ray beams, a 3D rendering of the real shape and size of the diffracted X-ray beams in the 3D reciprocal space can be obtained. For a typical small molecule sample a voxel grid size of 512×512×512 will provide sufficient resolution, whereas for a protein or other large molecule sample a voxel grid size of 2048×2048×2048 would be preferred to show good resolution of the diffraction pattern. The size of the voxel grid may be larger in future as the specification of personal computers increases to support it.

In case the 3D reciprocal space is divided into an array of voxels (or voxel grid) as described above, the mapping may include mapping the distinguished (crystallographically meaningful or sample relevant) X-ray diffraction data of the 2D image frame (that is, the pixel values of the 2D pixel image which are proportional to the diffraction intensities measured by the 2D X-ray detector) into corresponding voxels of the 3D reciprocal space. This may also be expressed as not mapping those pixels of each 2D image frame which have been distinguished as background (i.e. not containing crystallographically meaningful X-ray diffraction data, like unwanted background). The 2D pixel image to 3D voxel image mapping may be performed taking into account the sample orientation, detector geometry, detector position relative to the sample and/or Ewald sphere geometry as described above. Accordingly, only pixel image data of the 2D image frame representing crystallographically meaningful X-ray diffraction data (or sample relevant X-ray diffraction data) may be mapped into corresponding voxels of the voxel grid so that a 3D diffraction map is generated which represents the whole diffraction data at a glance.

The presently available specification of personal computers is not able to process in near real-time the data from a fully used voxel grid. Let us take the example of a voxel grid of size 1024×1024×1024. Each used voxel would contain at least 2 bytes of data to represent the intensity of the X-ray diffraction data. The total data size from the fully used voxel grid would thus be 2 gigabytes. By distinguishing the crystallographically meaningful (sample relevant) X-ray diffraction data from the unwanted background in each of the 2D image frames it is necessary to map only a small fraction of the pixels (may be 5%) into voxels in the 3D grid. The voxel grid is thus sparsely populated with data (may be 5% of voxels contain data). Instead of storing the whole voxel grid in computer memory it is more efficient to store a list of filled voxels, recording their three-dimensional location in the grid (4 bytes) and the intensity value of the X-ray diffraction data (2 bytes) which results in approximately 300 megabytes of data in this example. This significant reduction in the amount of data to be processed is important to achieving near real-time performance of the mapping and visualisation process.

The visualizing step may include visualizing an empty 3D reciprocal space and successively populating the empty 3D reciprocal space with the mapped X-ray diffraction data. In this context successively populating may mean adding mapped X-ray diffraction data (e.g., diffracted X-ray beams) obtained from currently generated 2D image frames in the 3D reciprocal space, while previously mapped and visualized X-ray diffraction data extracted from previous 2D image frames remain visible in the 3D reciprocal space. Thus, the initially empty 3D space will be continuously filled with new X-ray diffraction data while the sample is rotating so that the whole reciprocal lattice structure of the sample becomes more and more visible.

According to one implementation (sample relevant) X-ray diffraction data (such as diffraction beams, satellite beams) appearing redundantly in two or more 2D image frames and being mapped into the same positions (voxels) in the 3D reciprocal space may be highlighted for a short time during the visualization step. The highlighting may include using a color pulse (e.g., a pulse of white color) on those positions (voxels) in the 3D reciprocal space, where overlapping redundant X-ray diffraction data is added to the 3D reciprocal space. This highlighting in the 3D reciprocal space signals a user that the measurement of the sample is still going on. In order to reduce the amount of data stored in the voxel grid, the redundant data being mapped into the same position (voxel) is stored as a single average value calculated from redundant measurements.

The mapped X-ray diffraction data may be visualized in the form of 3D spots in the 3D reciprocal space. Each 3D spot may visualize the size, shape and/or intensity of the X-ray diffraction data (such as X-ray diffraction peaks, diffuse scattered X-rays or other scattering features or artifacts) which the 3D spot is representing. For the purpose of visualization each 3D spot may assume a color value, color shade and/or brightness which is proportional to the intensity of the X-ray diffraction data the 3D spot is representing. If the 3D reciprocal space is represented by a voxel grid, each 3D spot may be represented by at least one voxel. The number of voxels used for representing a 3D spot may depend on the size and shape of the 3D spot to be visualized and the grid resolution. Still further, the at least one voxel representing a 3D spot may carry an image information (e.g., a color value, color shade, brightness) which is proportional to the intensity of the X-ray diffraction data the 3D spot is representing.

The visualizing step may be performed in accordance with at least one preselected visualizing parameter. The at least one preselected visualizing parameter may be indicative of an intensity level for the X-ray diffraction data. If a predetermined intensity level is selected for the visualizing step, only mapped X-ray diffraction data having intensities below or above the preselected intensity level may be visualized in the 3D reciprocal space. For instance, the at least one visualizing parameter may be indicative of a preselected minimum intensity level and/or a preselected maximum intensity level. In such a case, mapped X-ray diffraction data representing X-ray intensities being above the minimum intensity level, below the maximum intensity level or in between the minimum and maximum intensity level can be made visible in the 3D reciprocal space. In such a case, the visualization step is designed to implement a high-pass, low-pass or band-pass filter functionality.

The at least one preselected visualizing parameter may be indicative of a d-spacing resolution value for the X-ray diffraction data. The term d-spacing is used to mean the spacing between neighbouring lattice planes in the crystal structure of the sample. If a predetermined d-spacing resolution value is selected for the visualizing step, only mapped X-ray diffraction data having d-spacing resolution values below or above the preselected d-spacing resolution value may be visualized in the 3D reciprocal space. For instance, the at least one visualizing parameter may be indicative of a preselected minimum d-spacing resolution value and/or a preselected maximum d-spacing resolution value. In such a case, mapped X-ray diffraction data representing X-ray d-spacing resolution values being above the minimum value, below the maximum value or in between the minimum and maximum values can be made visible in the 3D reciprocal space. In such a case, the visualization step is designed to implement a high-pass, low-pass or band-pass filter functionality.

The 3D reciprocal space may be visualized on a graphical user interface in such a manner that the space is rotatable and/or zoomable. By rotating the reciprocal space it is possible to inspect the reciprocal lattice from different perspectives. Further, by zooming in or out the reciprocal space it is possible to visualize the whole or only a part of the reciprocal lattice.

In a possible implementation, part of the 3D reciprocal space may be visualized on a graphical user interface on a defined plane which cuts through the space. Only those voxels intersecting with that plane would be visualized in this implementation. The user would be able to control the orientation of that plane and then slide the plane along the directions perpendicular to the plane to observe which voxels are visualised. The control of the plane would be achieved using an input unit connected to the computer controlling the visualization.

In a possible implementation, numerical or textual information may be displayed together with the 3D reciprocal space (in form of an overlay) on the graphical user interface to provide the user with additional information about the displayed X-ray diffraction data. For example (hkl)-indices may be displayed alongside voxels showing Bragg diffraction peaks or (x, y, z)-coordinates may be displayed to aid understanding of the lattice (and sample) orientation.

The acquiring step may include reading out the X-ray diffraction data (intensity data) from the 2D X-ray detector. The acquiring step may further include buffering the read out X-ray diffraction data in storage.

According to a further aspect a computer program product is provided having program code for carrying out the method described above, when the computer program product is executed on a computer device. The program code of the computer program product is stored on a non-transitory recording medium. The recording medium may be a DVD, CD, a solid state memory, or any other non-transitory recording medium.

According to a further aspect an apparatus for processing X-ray diffraction data is provided, wherein the X-ray diffraction data is provided by an X-ray detector configured to detect diffracted X-ray beams of a sample to be investigated. The apparatus includes a processing unit (processor) configured to: acquire X-ray diffraction data from an X-ray detector while the sample is rotating with respect to an incident X-ray beam; generate a 2D image frame from the acquired X-ray diffraction data, wherein the 2D image frame includes 2D image data representing X-ray diffraction data including sample relevant X-ray data and background data for a specific rotational position of the sample; for the generated 2D image frame, distinguish the sample relevant X-ray diffraction data from the background data, and to map the distinguished sample relevant X-ray diffraction data of the 2D image frame into a 3D reciprocal space; and a visualization unit configured to visualize the 3D reciprocal space along with the mapped X-ray diffraction data on a display screen.

The apparatus may further include an input unit configured to receive at least one preselected visualizing parameter. As input unit a touch screen, mouse, keyboard, or any other input unit may be provided.

According to still another aspect of the present invention an X-ray device for X-ray diffraction measurement is provided. The X-ray device includes: an X-ray detector configured to detect diffracted X-ray beams of a sample to be investigated; the above described apparatus for processing X-ray diffraction data acquired from the X-ray detector; and a display screen configured to display the 3D reciprocal space with the processed X-ray diffraction data.

BRIEF DESCRIPTION OF THE DRAWINGS

Further details, aspects and advantages of the present disclosure described herein will become apparent from the following drawings in which:

FIGS. 5a-5d illustrate various diffraction patterns obtained by the X-ray diffraction data processing technique according to the present invention.

DETAILED DESCRIPTION

In the following description, for the purpose of explanation and not limitation, specific details are set forth in order to provide for a thorough understanding of the present technique of processing X-ray diffraction data. It will be apparent for one skilled in the art that the disclosed method and apparatus for processing X-ray diffraction data and the disclosed X-ray device for X-ray diffraction measurement may deviate within the scope of protection from specific details set forth hereinafter.

Figure 1:
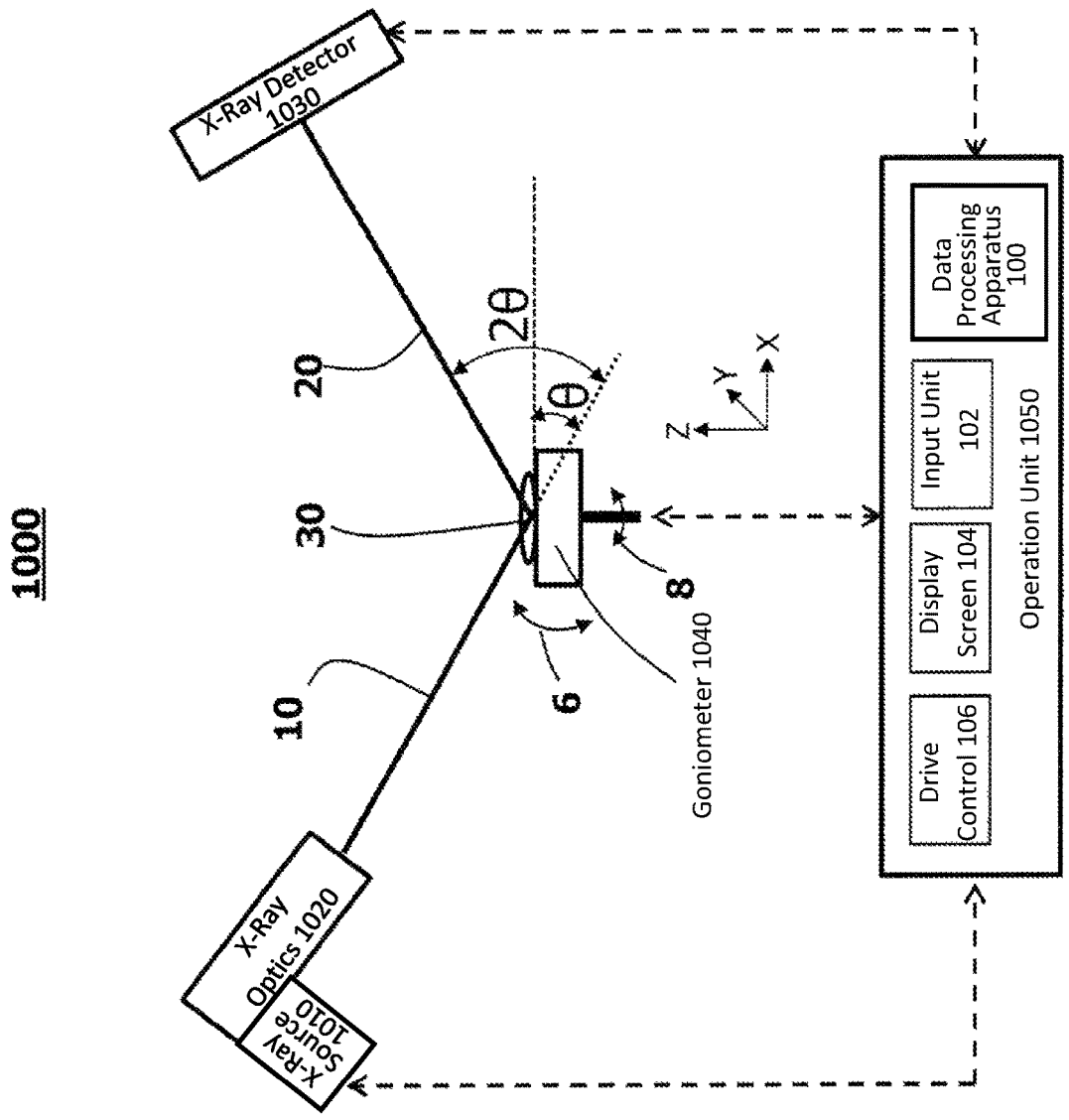
FIG. 1 is a schematic drawing of an X-ray device for X-ray diffraction measurements according to the present invention.

In the following reference is made to FIG. 1. FIG. 1 illustrates a schematic representation of an X-ray device 1000 according to the present invention. The X-ray device 1000 is an X-ray diffractometer designed for carrying out X-ray diffraction analysis on a crystalline sample 30.

The X-ray device 1000 includes an X-ray source 1010 configured to generate a beam of monochromatic or polychromatic (white) X-rays. As X-ray source a conventional monochromatic or polychromatic X-ray source may be used. The X-ray device 1000 further includes an X-ray optics 1020 which is optically coupled with the X-ray source 1010 and which is configured to collimate and direct the beam of X-rays to the sample 30 to be investigated. In FIG. 1 the beam is denoted with reference numeral 10.

The X-ray device 1000 further includes an X-ray detector 1030 configured to detect the diffracted X-ray beams (denoted with reference numeral 20 in FIG. 1). The X-ray detector 1030 is designed as two-dimensional (2D) detector which consists of one planar surface, or several segmented planar surfaces, or curved surfaces. The 2D X-ray detector 1030 is designed to measure the intensities of the diffracted X-ray beam(s) 20 reaching the detector surface. For instance, a 2D semiconductor-based detector may be used as X-ray detector 1030. As illustrated in FIG. 1 and explained in conjunction with FIGS. 4a to 4c in more detail, diffracted beams 20 at the detector surface can only be expected at angles Θ (or 2Θ when the incident beam 20 is used as measuring reference), for which the Bragg condition is met. Hence, by measuring the intensities and angles of the diffracted X-ray beams 20 conclusions can be drawn on the crystalline properties of the sample 30, such as its crystal structure (Bravais lattice), the presence of twins, superstructures etc.

In order to resolve the whole lattice structure of the sample 30 by X-ray diffraction, the sample 30 may be rotated with respect to the incident beam 10. For this purpose, the X-ray device 1000 includes a goniometer 1040 configured for rotatably supporting the sample 30. The rotational degrees of freedom provided by the goniometer 1040 are indicated by arrows 6 and 8 in FIG. 1.

Further, the X-ray device 1000 includes a (central) control and operation unit 1050 including a data processing apparatus 100, an input unit 102, a display screen 104 and a drive control 106.

The data processing apparatus 100 is configured to process X-ray diffraction data acquired by the detector 1030. The operation of the apparatus 100 will be described in more detail in conjunction with the subsequent FIGS. 2 and 3. The input unit 102 is configured to receive user command (e.g. drive commands) or user inputs for controlling the X-ray device 1000. The display screen 104 is configured to display image data processed by the apparatus 100. Moreover, the drive control 106 is configured to control drive units (not shown in FIG. 1) associated with the detector 1030, goniometer 1040 and/or X-ray source 1010 to move detector 1030, goniometer 1040 and/or X-ray source 1010 in their desired positions.

Figure 2:
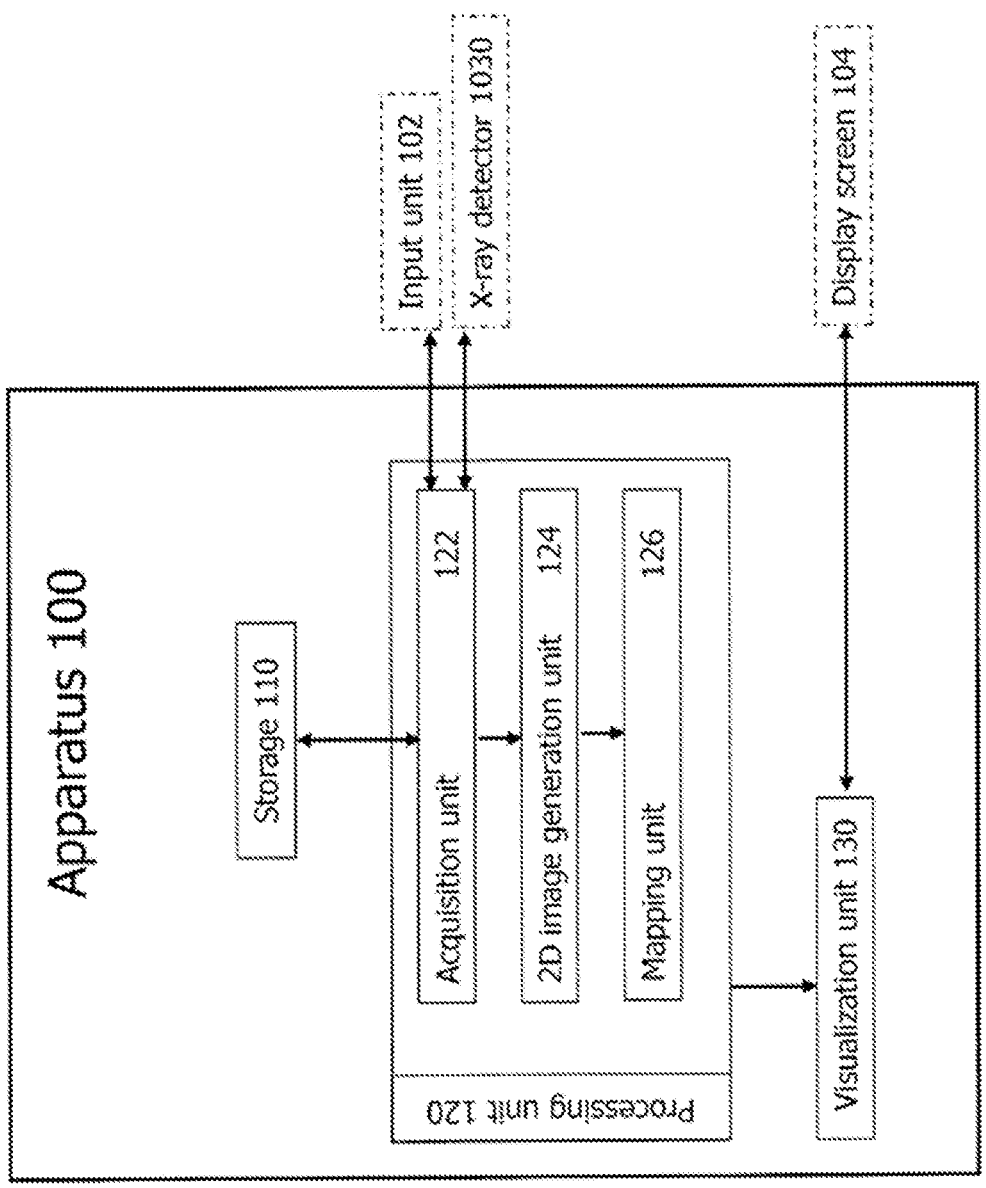
FIG. 2 is a block diagram of an apparatus for processing X-ray diffraction data according to the present invention.

FIG. 2 illustrates in form of a block diagram the apparatus 100 for processing X-ray diffraction data according to the present invention. The apparatus 100 may be part of the control and operation unit 1050 of FIG. 1. Alternatively, the apparatus 100 may be implemented as a separate apparatus or implemented in a computer device which is in communication with the X-ray device 1000.

The apparatus 100 includes a storage 110, a data processing unit 120 (in short processing unit 120) as well as a visualization unit 130. The apparatus 100 is in communication with the X-ray detector 1030, input unit 102 and display screen 104 of the X-ray device 1000.

The storage 110 is in communication with the processing unit 120. The storage 110 is designed to store or buffer at least X-ray diffraction data received from the X-ray detector 1030. The storage 110 may be also configured to store or buffer two-dimensional (2D) image data and three-dimensional (3D) image data generated by the processing unit 120 from the raw X-ray diffraction data. Further, the storage 110 may be configured to buffer input data received from the input unit 102. In order to perform the described storage functionalities the storage 110 may be implemented as solid state storage.

The processing unit 120 is designed to process the raw X-ray data (i.e., intensity data) provided by the X-ray detector 1030. For this purpose, the processing unit 120 implements several sub-modules, such as an acquisition unit 122, a two-dimensional (2D) image generation unit 124 as well as a mapping unit 126. Each of the units 122, 124 and 126 may be implemented as a programmable hardware module, a combined hardware and software module or as a software module including computer code for performing certain functionalities when the code is executed by a processor of the processing unit 120. The at least one processor (not shown in FIG. 2) may be implemented as a multi-core processor designed for parallel data processing. The functionalities of the units 122, 124 and 126 will be described in more detail in conjunction with FIG. 3.

The visualization unit 130 is in communication with the processing unit 120 and the display screen 104. The visualization unit 130 may be implemented as software module configured to present the processed data received from the processing unit 120 in a certain environment. For instance, the visualization unit 130 may implement a graphical user interface which is designed to represent the processed 3D image data. Moreover, the graphical user interface may be configured to receive input data in order to change the rendering of the 3D image data while the 3D image data are presented on the display screen 104.

Figure 3:
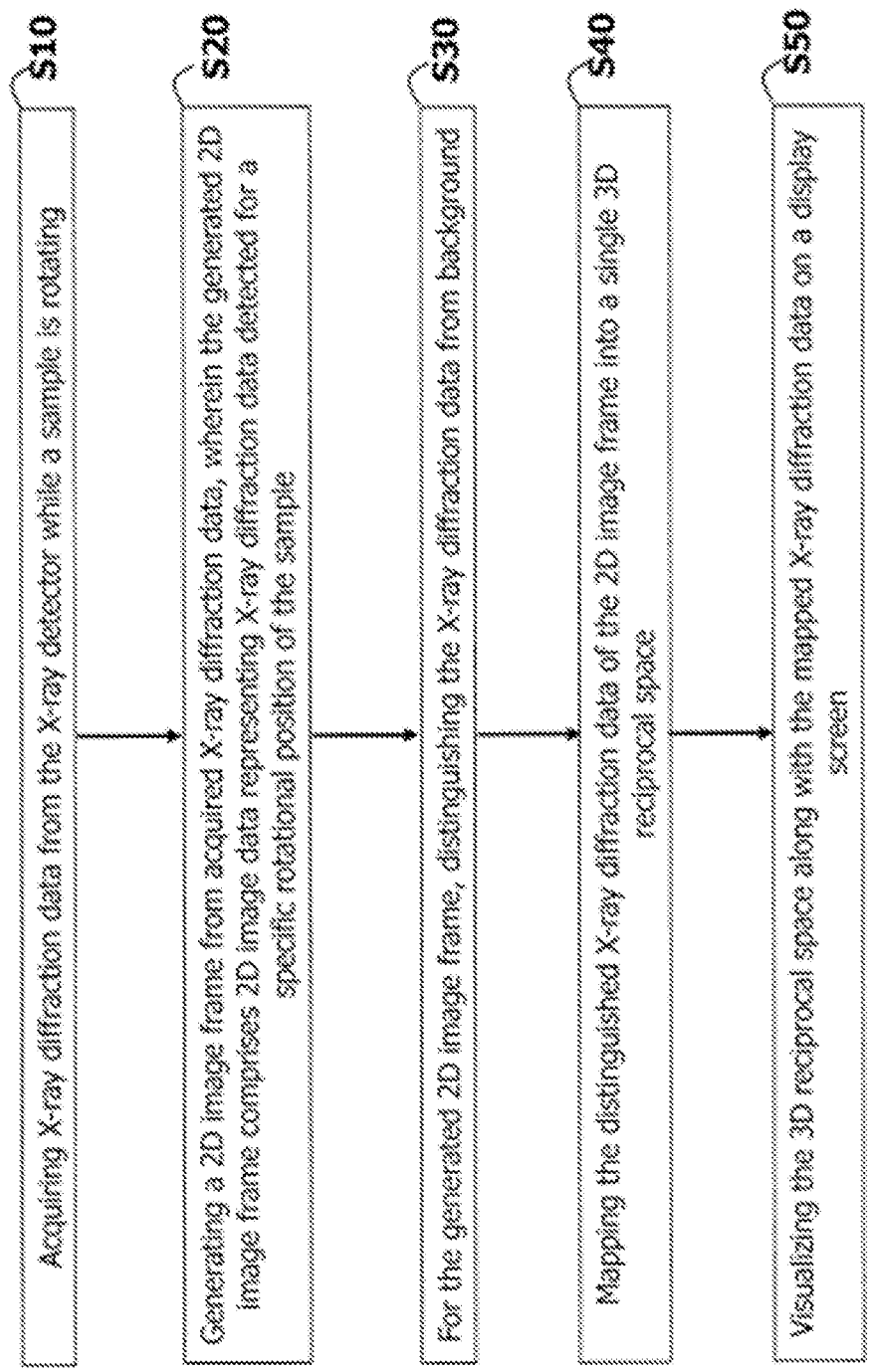
FIG. 3 is a flow diagram representing a computer-implemented method of processing X-ray diffraction data according to the present invention.

In conjunction with FIG. 3 a method for processing X-ray diffraction data according to the present invention is further described. The X-ray diffraction data are provided by an X-ray detector, such as detector 1030 of FIG. 2, which is configured to detect diffracted X-ray beams of a sample to be investigated, such as sample 30 of FIG. 1. The method is implemented by the apparatus 100 of FIG. 3 and includes the following steps.

In a first step S10 X-ray diffraction data is (continuously) acquired by the acquisition unit 122 from the X-ray detector 1030 while the sample 30 to be investigated is rotating. The acquiring step includes reading out the X-ray detector 1030 by the acquisition unit 122. The detector read-out may be performed in predetermined angular distances. For instance, a data read-out of the detector may be performed in rotation angle distances of 0.1° or higher. Further, the acquisition unit 122 may buffer the readout X-ray diffraction data in the storage 110. Still further, the acquisition unit 122 may retrieve the X-ray diffraction data buffered in the storage 110 and feed them to the 2D image generation unit 124 for subsequent data processing. The X-ray diffraction data acquired by the acquisition unit 122 include at least intensity data (or in short intensities) measured by the X-ray detector 1030.

In a subsequent second step S20, for a predetermined rotational position (or rotational angle or rotational angle interval) of the sample 30, a 2D image frame is generated by the 2D image generation unit 124 from the acquired 2D X-ray diffraction data. Hence, the 2D image frame includes 2D image data representing (a spatial distribution of) diffracted X-ray beams, satellite beams and/or diffuse scattered X-rays detected for the specific rotational position of the sample 30. Moreover, the 2D image data may further include other experimental artifacts (such as diffraction from ice on the crystal, scattering from hardware such as pinhole, beamstop or high pressure cell gasket) and additionally background data caused by incoherent Compton scattering or (detector) noise. Each of the detected diffracted beams, satellite beams and/or diffuse scattered X-rays is marked by a corresponding 2D spot in the 2D image frame. Each 2D spot may be represented by a color shade, brightness value or other image parameter which scales with the measured intensity of the corresponding X-ray beam. Further, the spots of each generated 2D image frame may have a size and shape which corresponds to the real size and shape of the diffracted beams as detected by the 2D detector 1030.

If the 2D image frame is rendered as pixel image (i.e., an array of pixels), the step S20 includes generating pixel image data for the 2D image frame, wherein each pixel of the 2D image frame includes image data (such as a color shade, brightness values) which scales with the measured intensities. In other words, each pixel of the 2D image frame includes at least one image parameter value (e.g., a brightness value and/or a color value) which is proportional to the measured intensity. Thus, each spot representing a diffracted X-ray beam (a satellite beam or diffuse scattered beam) may be represented by one or more pixels.

In a subsequent step S30 the crystallographically meaningful (sample relevant) X-ray diffraction data represented in the 2D image frame is distinguished (segmented), by the 2D image processing unit 124, from other background data (through the use of an appropriate image processing algorithm as described above). With crystallographically meaningful (sample relevant) X-ray diffraction data 2D image information of the 2D image frames is meant which represents diffracted X-ray beams, X-ray satellite beams, diffuse scattered X-rays (and artifacts, e.g. ice on the sample, X-ray scattering from instrument parts such as pinholes, beamstop or high pressure cell gasket), but not the unwanted background (caused, for instance, by detector noise or Compton scattering). If the 2D image is rendered as pixel image, the distinguishing step includes selecting only those pixels from the array of pixels representing X-ray image data, and eliminating the remaining pixels associated with background.

In the following step S40, the distinguished (sample relevant) X-ray diffraction data is mapped into a 3D space (3D reciprocal space or 3D momentum space). The 2D-to-3D data mapping is performed by the mapping unit 126 in FIG. 2 and will be described in more detail in conjunction with FIGS. 4a to 4c below. Moreover, in order to provide a (near) real-time data processing and visualization the mapping unit 126 is designed to perform the data mapping of the 2D image data into 3D space as soon as a 2D image frame is available (i.e., as soon as a 2D image frame is generated by the 2D image generation unit 124 and handed over to the mapping unit 126).

In the following the mapping algorithm performed by the mapping unit 126 is explained in more detail. The mapping unit 126 is designed to map the crystallographically meaningful (sample relevant) X-ray diffraction information derivable from each 2D image frame into corresponding positions in the 3D reciprocal space by taking into account at least the rotational position of the sample for each image frame. The 2D-to-3D data mapping will further be discussed in conjunction with FIGS. 4a to 4c.

Figure 4A:
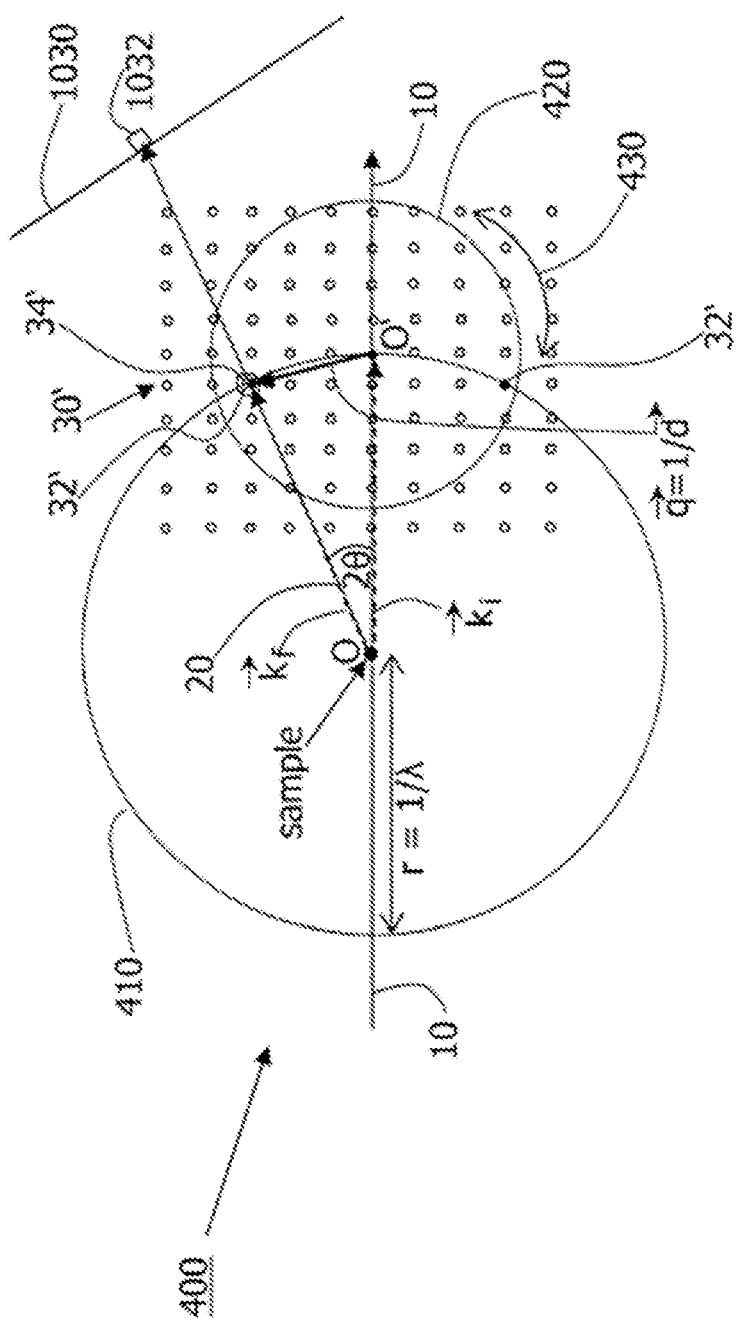
FIGS. 4a-4c are sketches illustrating the relationship between a reciprocal lattice of a sample to be investigated and the diffraction data acquired by a 2D detector.

FIG. 4a shows a geometric representation of the elastic scattering of an incident X-ray beam 10 on a sample 30 to be investigated using the so-called Ewald sphere construction. For the sake of clarity, a 2D representation of the Ewald sphere is represented in FIG. 4a. Accordingly, the Ewald sphere is represented by circle 410 (in reality it is a 3D sphere), the radius r of which corresponds to the inverse wavelength $\lambda$ of the incident X-ray beam 10. The origin O of the Ewald sphere 410 coincides with the position of the sample 30 to be investigated. Also shown in FIG. 4a is the reciprocal lattice 30' of the sample 30 to be investigated. Again, due to the 2D representation in FIG. 4a the reciprocal lattice 30' is represented as 2D lattice (in reality it is a 3D lattice). The origin O' of the reciprocal lattice lies on the Ewald sphere and the incident beam 10 goes through the origin O of the Ewald sphere 410 and the origin O' of the reciprocal lattice 30'. In FIG. 4a a further circle 420 (in reality it is also a sphere) is illustrated. The circle/sphere 420 has a radius r'=1/D. The radius r' represents the limit of resolution of the sample 30, and D represents a threshold of the d-spacing value which shall be resolved by the X-ray diffraction experiment.

From the geometric representation in FIG. 4*a* it becomes further clear that the Bragg condition for elastic scattering, where the wave vector $\vec{k}_i$ of the incident X-ray beam 10 must have the same amount as the wave vector $\vec{k}_f$ of the diffracted beam 20 (with $|\vec{k}_f|=|\vec{k}_i|=1/\lambda$), is only fulfilled for scattering vectors q that start in the origin O' and end on the surface of the Ewald sphere 410. In other words, the Bragg condition is fulfilled and diffraction will only occur for reciprocal lattice points that lie on the Ewald sphere 410. As schematically illustrated in FIG. 4*a* only those reciprocal lattice points 32' which lie within the limiting sphere 420 and which hit the Ewald sphere 410 surface lead to detectable diffraction spot(s) at position 1032 on the X-ray detector 1030.

Figure 4B:
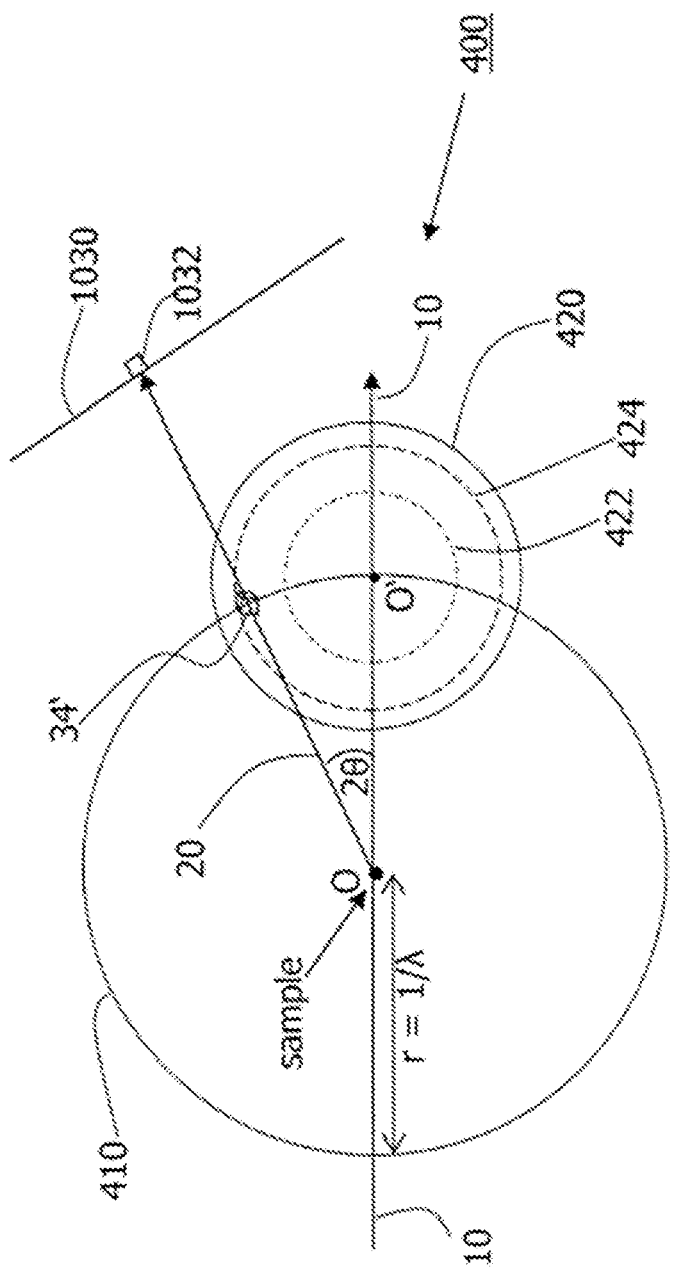

FIG. 4*b* shows the same Ewald sphere construction as FIG. 4*a*. The only difference is that the radius r' of the limiting sphere 420 is changed, by for instance pre-setting a minimum d-spacing value (corresponding to limiting circle/sphere 424) and/or a maximum d-spacing value (corresponding to limiting circle/sphere 422). The d-spacing values can be set by a user using the input unit 102. Accordingly, by pre-setting a minimum and/or maximum d-space value, only X-ray diffraction data (spots) lying above the minimum value (inside circle 424), below the maximum value (outside circle 422) or within the minimum and maximum d-spacing values (within circles 422, 424) are made visible.

Figure 4C:
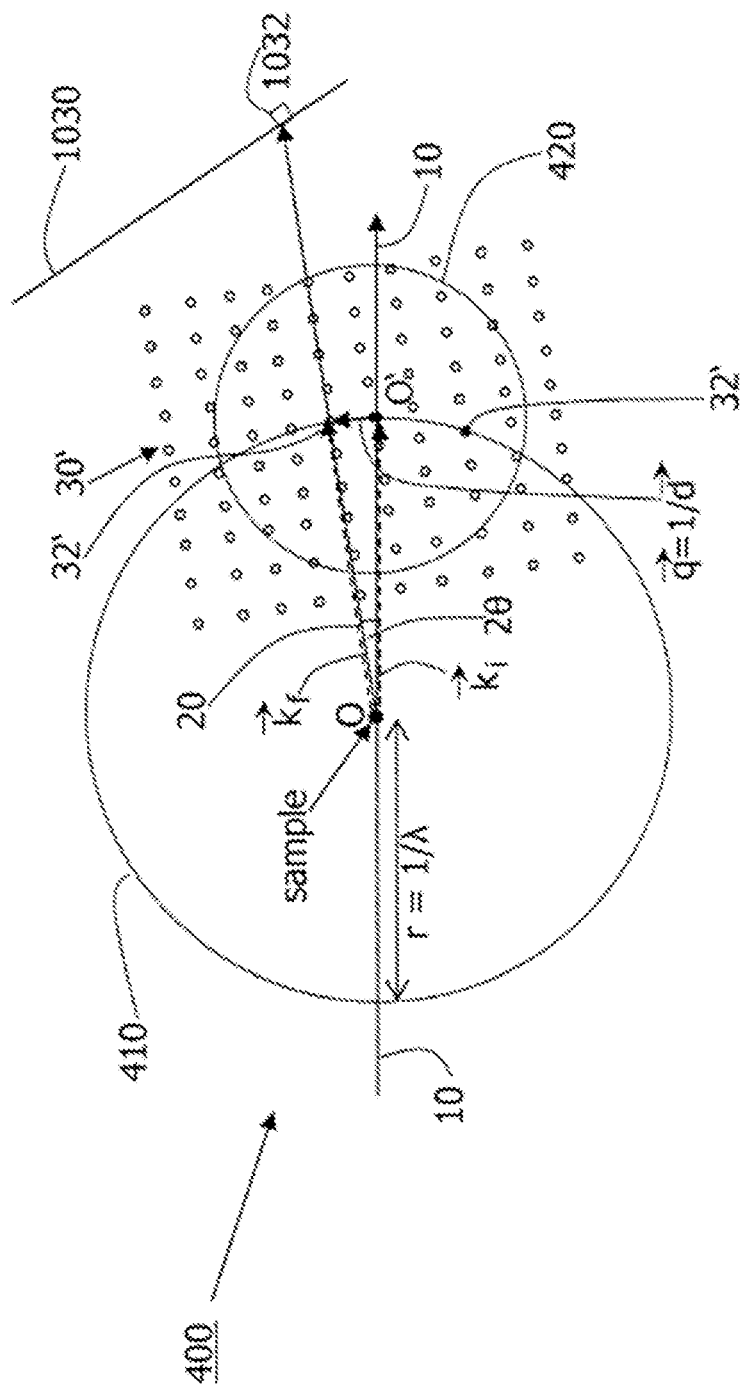

It is clear that for a certain sample orientation only a few lattice points 32' lie on the Ewald sphere surface 410 and lead to detectable diffraction spots at positions 1032 on the X-ray detector surface. By rotating the sample 30 with respect to the incident X-ray beam 10, also the reciprocal lattice 30' of the sample 30 is rotating (see FIG. 4*c*). The rotation of the reciprocal lattice 30' is indicated by arrow 430 in FIG. 4*a*. Moreover, FIG. 4*c* illustrates a rotation of the sample's reciprocal lattice 30' with respect to the reciprocal lattice 30' in FIG. 4*a*. Accordingly, by rotating the sample 30 new reciprocal lattice points 32' will appear on the Ewald sphere surface, leading to diffraction spots at different angular positions on the X-ray detector 1030. A comparison of FIGS. 4*a* and 4*c* makes clear that a rotation of the sample leads to diffraction spots at different 2θ-angles and, therefore, at different positions on the detector surface.

From the FIGS. 4*a*-4*c* it becomes clear that the Ewald sphere construction provides a clear relationship between the 3D reciprocal lattice of the sample 30 and the X-ray diffraction pattern (i.e. angular distribution of the diffraction spots) acquired by the detector 1030 for different rotational positions of the sample. Hence, by knowing the parameters wavelength λ of the X-ray beam (and therefore the Ewald sphere radius r), rotational position of the sample 30, detector size and detector's position relative to the sample 30, the mapping algorithm can reconstruct from the 2D diffraction patterns acquired for different rotational positions of the sample 30 the whole reciprocal lattice 30' of the sample 30. Or in other words, by considering the wavelength λ of the incident X-ray beam 10, the rotational position of the sample 30, detector size and detector's (radial and angular) position relative to the sample 30, it is possible to map the detected X-ray diffraction spots of the X-ray detector 1030 and imaged in corresponding 2D image frames into corresponding positions of the 3D space so that the 3D reciprocal lattice can be re-constructed. This mapping of the 2D image data into the 3D reciprocal space is indicated in FIGS. 4*a* and 4*b* illustrating that the cubic space element 34' (or voxel) at reciprocal space point 32' correlates with the detected X-ray diffraction spot at detector position 1032 (or pixel position 1032). A set of consecutive 2D diffraction patterns at different rotational positions of the sample 30 is sufficient in order to reconstruct the 3D reciprocal lattice of the sample 30.

It is noted that the above described mapping algorithm based on Ewald sphere reconstruction only maps the crystallographically meaningful (sample relevant) X-ray diffraction information derivable from the 2D image frame into the 3D reciprocal space, disregarding background data, so that a complete three-dimensional diffraction pattern is obtained in the 3D reciprocal space.

According to one variant the 3D reciprocal space is rendered as 3D raster graphics, wherein the reciprocal space is divided into a voxel grid. In other words, the 3D reciprocal space is divided into a 3D array of volume cells (i.e. voxels). The size of voxels (and consequently the number of voxels) of the voxel grid may be adjustable and may be chosen such that position, size and shape of diffracted X-ray beams are sufficiently resolved in the 3D reciprocal lattice representation. It has been found that a voxel grid of 1024×1024×1024 voxels for representing the 3D reciprocal space is sufficient for the most experimental needs. If the 3D reciprocal space is represented by a voxel grid, the mapping includes mapping the 2D pixel image data (i.e., the crystallographic meaningful (sample relevant) X-ray diffraction data) of the 2D image frame into corresponding voxels of the 3D voxel space. The 2D detector pixel to 3D voxel mapping follows the mapping algorithm as explained in conjunction with FIGS. 4*a* to 4*c*. Back to FIG. 3. After the mapping step S40 has been performed, the mapped X-ray diffraction data of the 2D image frame is visualized by the visualizing unit 130 in the 3D reciprocal space. The visualizing includes representing the mapped (sample relevant) X-ray diffraction data (i.e., mapped diffracted beams, satellite beams and/or diffused scattered X-rays) as 3D spots in the 3D reciprocal space. If the 3D reciprocal space is rendered as raster graphics, each 3D spot is represented by at least one voxel. The number of voxels required for representing a 3D spot depends on the size and shape of the spot to be visualized in the 3D space. The size and shape of the 3D spot, in turn, corresponds to the real size and shape of the diffracted beam measured by the X-ray detector. Therefore, according to the present data processing technique not only the location of the spots is mapped into the 3D space (that is the location where the X-ray beam can be expected in the reciprocal space), but also the shape and size is mapped. Moreover, the mapping and visualization of the diffracted X-ray beams is performed in real time, that is, as soon as new 2D image frames with diffracted X-ray beams appear.

Depending on the sample to be investigated the mapping and visualization of the whole X-ray diffraction information may lead to dense diffraction patterns in the 3D reciprocal space so that individual diffraction spots may be hardly distinguishable from each other or from the background. In order to further improve the visualization the visualising unit may provide a user with a selection tool (for instance, via a graphical user interface generated by the visualizing unit 130), in which the user can define which of the mapped X-ray diffraction data shall be visualized in the 3D reciprocal space. According to one variant, the user can define over the selection tool an intensity range for the mapped X-ray diffraction data which shall be preferably visualized in the 3D reciprocal space. For instance, the user can define a minimum intensity level (or minimum intensity threshold) so that the visualizing unit 130 only visualizes mapped X-ray diffraction data associated with intensities higher than the minimum intensity level (realization of a so-called high pass filter). It is also conceivable that the user defines a maximum intensity level (or maximum intensity threshold) so that the visualizing unit 130 suppresses visualization of mapped X-ray diffraction data representing intensities higher than the maximum intensity level (realization of a low pass filter). It is further conceivable that the user defines a minimum intensity level and upper intensity level so that the visualizing unit 130 only represents mapped X-ray diffraction data representing intensities lying in between the lower and upper intensity level (so-called band pass filter). By setting corresponding intensity levels (thresholds) different properties of the mapped 3D diffraction pattern can be visualized and studied. For instance, the mapped background and diffuse scattering portion is reduced in order to make visible more clearly the 3D spots representing the Bragg peaks. It also conceivable that the high intensity Bragg peaks are suppressed in order to make better visible the diffuse scattering portion.

Redundant information in the measured X-ray diffraction data is also visualised (and temporarily highlighted for the users' attention) such that the 3D reciprocal space view is built up during the experiment from all of the measured information. In normal operation the redundant data will overlap. In the case that the measurement apparatus is not operating correctly or that the software calibration of the instrument's geometrical angles is not precise enough then the user will be able to see redundant data does not overlap and the 3D reciprocal space will show distorted, enlarged or split features in the diffracted beams.

Further, the 3D reciprocal space may be visualised in other projections. For example the X-ray diffraction data may be shown on the graphical display in a stereographic or gnomonic projection, which may also aid the user with intuitive crystallographic interpretation of the data.

It is clear that the above described method steps S10-S50 are repeated while the sample is rotated so that a complete 3D X-ray diffraction pattern (including artifacts, but no background) can be generated and made visible.

Reference is now made to FIGS. 5a-5d. FIGS. 5a-5d show images of 3D diffraction patterns obtained for different samples by the above described X-ray data processing technique. The images in FIGS. 5a-5d represent localized bright spots corresponding to diffraction peaks in the 3D reciprocal space. As already mentioned in the background section above, diffraction peaks in the 3D reciprocal space appear when the Bragg condition is met. The spots in the FIGS. 5a-5d follow specific patterns with specific symmetries. These patterns represent the reciprocal lattice of the investigated samples. The reciprocal lattice is the lattice in the reciprocal space. Each reciprocal lattice, in turn, can be associated with a real lattice structure (Bravais lattice) of the sample via Fourier transform. Therefore, crystallographic properties, such as lattice structure, lattice symmetry, crystal quality (degree of crystallinity, presence of twins, interlayers) of the sample can be easily deduced from the visualized diffraction patterns.

Moreover, besides the main diffraction beams the present X-ray data processing technique also allows for visualization of less prominent features, such as: diffuse scattered X-rays between main spots (see e.g., FIG. 4a); double peak structures (see, e.g., FIG. 5d) which may be indicative of the presence of twins; superspots and lattice modulations (see, e.g., FIG. 5b) which may be indicative of the presence of substructures in the sample; or complex structures consisting of a plurality of weaker satellite peaks (e.g., FIG. 5c) indicative of quasicrystal structures. Therefore, with the present technique it is possible to obtain the full diffraction information at a glance.

The above described technique may be applied to the study of powder or multi-grain samples by X-ray diffraction. The acquired 2D image frames from those samples will contain more meaningful X-ray diffraction data, as compared to single crystal samples, since the diffraction takes the form of lines rather than isolated peaks. Thus more pixels from the 2D image frames will be mapped into the 3D reciprocal lattice resulting into more densely filled voxels in the grid. In order to better visualise the data in this case the d-spacing resolution value should be applied as a band-pass filter. In such a case, mapped X-ray diffraction data representing X-ray d-spacing resolution values being in between the minimum and maximum values can be made visible in the 3D reciprocal space. In this filtered visualisation the user will be able to observe oriented features in the data (e.g. from fiber diffraction or directionally oriented powder). From this visualisation the user may also generate a pole figure, which is a stereographic projection representing the orientation distribution of crystallographic lattice planes and texture analysis.

The described technique has the following advantages compared to evaluation or imaging techniques known from the prior art. First of all, the whole diffraction information of a sample is illustrated/mapped into one single 3D space. There is no need to record a sequence of image frames and to compare different image frames of the sequence with one another. Furthermore, the mapping of the image data into 3D reciprocal space removes the geometrical distortion which occurs due to measurement on a 2D detector. The view of 3D reciprocal space provides crystallographically meaningful, intuitive information to the user. Thus, the crystallographic properties of the sample can be evaluated faster and the risk of missing important features (e.g., presence of twins, superstructures, interlayers in the sample) is considerably reduced compared to conventional X-ray imaging techniques. Moreover, the mapping and imaging is performed in real-time. That gives the user the chance to stop the X-ray diffraction analysis as soon as sufficient information required for estimating the quality of the samples is received. There is no need to wait until the whole sequence of image frames is obtained.

While the above description constitutes the preferred embodiment of the present invention, it will be appreciated that the invention is susceptible to modification, variation and change without departing from the proper scope and fair meaning of the accompanying claims.

The invention claimed is:

1. A computer-implemented method of processing X-ray diffraction data, the X-ray diffraction data being provided by an X-ray detector configured to detect diffracted X-ray beams of a sample to be investigated, the method including the steps of:

acquiring the X-ray diffraction data from the X-ray detector while the sample is rotating with respect to an incident X-ray beam, generating a 2D image frame from the X-ray diffraction data, wherein the generated 2D image frame includes 2D image data representing the X-ray diffraction data for a specific rotational position of the sample, the X-ray diffraction data including sample relevant X-ray diffraction data and background data;

for the 2D image frame, distinguishing the sample relevant X-ray diffraction data from the background data;

mapping the distinguished sample relevant X-ray diffraction data of the generated 2D image frame into a single 3D reciprocal space; and visualizing the 3D reciprocal space along with the mapped X-ray diffraction data on a display screen;

wherein the method steps are continuously repeated while the rotational position of the sample is changing.

2. The method according to claim 1 wherein the X-ray diffraction data includes intensity data measured by the X-ray detector, and wherein the generating a 2D image frame method step includes converting the measured intensity data into corresponding 2D pixel image data.

3. The method according to claim 1 wherein the distinguishing the sample relevant X-ray diffraction data from the background data step includes, distinguishing pixels of the 2D image frame representing the X-ray diffraction data from pixels of the 2D image frame representing the background data.

4. The method according to claim 3 wherein the mapping step includes, mapping the distinguished 2D pixels representing the sample relevant X-ray diffraction data into the 3D reciprocal space.

5. The method according to claim 1 wherein the mapping of the distinguished sample relevant X-ray diffraction data of the generated 2D image frame into the 3D reciprocal space is performed based on at least one of the following parameters, a sample orientation, a detector size, a detector position relative to the sample, an X-ray wavelength, and an Ewald sphere geometry.

6. The method according to claim 1 wherein the mapping step includes, reconstructing the X-ray diffraction data of the sample to be investigated in the 3D reciprocal space based on a subset of acquired X-ray diffraction data and a known crystal symmetry; and wherein the visualizing step includes visualizing the reconstructed X-ray diffraction data on the display screen.

7. The method according to claim 1 wherein the 3D reciprocal space is represented by a voxel grid, and wherein the mapping step includes, mapping the distinguished X-ray diffraction data of the 2D image frame to corresponding voxels of the 3D reciprocal space.

8. The method according to claim 7 wherein the X-ray diffraction data after the mapping representing a diffracted X-ray beam is visualized by at least one voxel in the 3D reciprocal space.

9. The method according to claim 1 wherein the visualizing step includes, visualizing an empty of the 3D reciprocal space and successively populating the empty 3D reciprocal space with the X-ray diffraction data after the mapping derived from the generated 2D image frame.

10. The method according to claim 7 wherein X-ray diffraction data appearing redundantly in two or more of 2D image frames and being mapped on a same voxel position in the 3D reciprocal space is highlighted for a short time during the visualizing step.

11. The method according to claim 1 wherein the visualizing of the X-ray diffraction data after the mapping is performed in accordance with at least one preselected visualizing parameter.

12. The method according to claim 11 wherein the at least one preselected visualizing parameter is indicative of a minimum intensity level and, or a maximum intensity level to be visualized, and wherein the X-ray diffraction data after the mapping representing X-ray intensities being above the minimum intensity level, below the maximum intensity level or in between the minimum and maximum intensity levels are made visible in the 3D reciprocal space.

13. The method according to claim 11 wherein the at least one preselected visualizing parameter is indicative of a minimum d-spacing resolution value or a maximum d-spacing resolution value to be visualized, and wherein the X-ray diffraction data after the mapping representing d-spacing resolution values being above the minimum value, below the maximum value, or in between the minimum and the maximum values are made visible in the 3D reciprocal space.

14. The method according to claim 1 wherein the 3D reciprocal space visualized on the display screen is rotatable and, or zoomable.

15. A computer program product with program code stored on a non-transitory recording medium for carrying out the method according to claim 1 when the computer program product is executed on a general purpose computer device.

16. An apparatus for processing X-ray diffraction data, the X-ray diffraction data being provided by an X-ray detector configured to detect diffracted X-ray beams of a sample to be investigated, the apparatus including:

a processor configured to:

acquire the X-ray diffraction data from the X-ray detector while the sample is rotating with respect to an incident X-ray beam;

generate a 2D image frame from the acquired X-ray diffraction data, wherein the 2D image frame includes 2D image data representing the X-ray diffraction data including sample relevant X-ray diffraction data and background data for a specific rotational position of the sample;

for the generated 2D image frame, distinguish the sample relevant X-ray diffraction data from the background data;

map the distinguished sample relevant X-ray diffraction data of the 2D image frame into a single 3D reciprocal space; and a visualization unit configured to:

visualize the 3D reciprocal space along with the mapped X-ray diffraction data on a display screen;

wherein the processing is continuously repeated while the rotational position of the sample is changing.

17. The apparatus of claim 16 further including, an input unit configured for receiving at least one preselected visualizing parameter.

18. An X-ray device for X-ray diffraction measurement, including:

the X-ray detector configured to detect diffracted X-ray beams of the sample to be investigated;

the apparatus according to claim 17 for processing X-ray diffraction data acquired from the X-ray detector; and a display screen configured to display the 3D reciprocal space with the processed X-ray diffraction data.

* * * * *